United States Patent
Jons et al.

(10) Patent No.: US 11,198,098 B2
(45) Date of Patent: Dec. 14, 2021

(54) SPIRAL WOUND MODULE ASSEMBLY INCLUDING INTEGRATED PRESSURE MONITORING

(71) Applicant: DDP SPECIALTY ELECTRONIC MATERIALS US, LLC, Wilmington, DE (US)

(72) Inventors: Steven D. Jons, Minneapolis, MN (US); Luke Franklin, Minneapolis, MN (US)

(73) Assignee: DDP SPECIALTY ELECTRONIC MATERIALS US, LLC, Wilmington, DE (US)

(*) Notice: Subject to any disclaimer, the term of this patent is extended or adjusted under 35 U.S.C. 154(b) by 0 days.

(21) Appl. No.: 16/492,971

(22) PCT Filed: Mar. 20, 2018

(86) PCT No.: PCT/US2018/023215
§ 371 (c)(1),
(2) Date: Sep. 11, 2019

(87) PCT Pub. No.: WO2018/187024
PCT Pub. Date: Oct. 11, 2018

(65) Prior Publication Data
US 2020/0016543 A1    Jan. 16, 2020

Related U.S. Application Data
(60) Provisional application No. 62/481,718, filed on Apr. 5, 2017.

(51) Int. Cl.
*B01D 63/12*    (2006.01)
*B01D 63/10*    (2006.01)
*B01D 61/12*    (2006.01)

(52) U.S. Cl.
CPC ............. *B01D 63/12* (2013.01); *B01D 61/12* (2013.01); *B01D 63/106* (2013.01);
(Continued)

(58) Field of Classification Search
CPC .......... B01D 2311/14; B01D 2311/165; B01D 2313/10; B01D 2313/12; B01D 2313/21;
(Continued)

(56) References Cited

U.S. PATENT DOCUMENTS

| 4,214,994 A | 7/1980 | Kitano et al. |
| 4,277,344 A | 7/1981 | Cadotte |

(Continued)

FOREIGN PATENT DOCUMENTS

| EP | 1844836 A2 * | 10/2007 | ........... B01D 61/147 |
| EP | 1844836 A2 | 10/2007 | |

(Continued)

OTHER PUBLICATIONS

"Machine Translation of JP2011045843A", Konishi et al., published 2011, 39 total pages. (Year: 2011).*

(Continued)

*Primary Examiner* — Dirk R Bass (57) ABSTRACT

A spiral wound module assembly including:
a plurality of spiral wound modules aligned within a pressure vessel with a first module located adjacent the first end and a second module located adjacent the second end,
a flow plate including opposing first and second sides positioned within the pressure vessel between the first spiral wound module and the first end of the pressure vessel with the first side facing the first spiral wound module and the second side facing the first end, and wherein the flow plate includes a plurality of holes passing from the first side to the second side which (Continued)

create a pressure drop in fluid passing from the first spiral wound module and the closer of the feed inlet port and concentrate outlet port; and a differential pressure sensor adapted to measure differences in pressure between fluid located on the opposing sides of the flow plate.

11 Claims, 4 Drawing Sheets (52) U.S. Cl.
CPC .... *B01D 2311/14* (2013.01); *B01D 2311/165* (2013.01); *B01D 2313/10* (2013.01); *B01D 2313/21* (2013.01); *B01D 2319/022* (2013.01)

(58) Field of Classification Search
CPC .............. B01D 2319/022; B01D 61/12; B01D 63/106; B01D 63/12
See application file for complete search history.

(56) References Cited

U.S. PATENT DOCUMENTS

| | | | |
|---|---|---|---|
| 4,795,559 A | 1/1989 | Shinjou et al. | |
| 5,435,957 A | 7/1995 | Degen et al. | |
| 5,538,642 A | 7/1996 | Solie | |
| 5,919,026 A | 7/1999 | Appleton | |
| 6,074,595 A | 6/2000 | Elsberg et al. | |
| 6,156,680 A | 12/2000 | Goettmann | |
| 6,165,303 A | 12/2000 | Darby et al. | |
| 6,299,772 B1 | 10/2001 | Huschke et al. | |
| 6,632,356 B2 | 10/2003 | Hallan et al. | |
| 6,878,278 B2 | 4/2005 | Mickols | |
| 7,048,855 B2 | 5/2006 | de la Cruz | |
| 7,886,582 B2 | 2/2011 | Palacios Donaque | |
| 7,951,295 B2 | 5/2011 | Larson et al. | |
| 8,142,588 B2 | 3/2012 | McCollam | |
| 8,210,042 B2 | 7/2012 | Mickols et al. | |
| 8,272,251 B2 | 9/2012 | Jons et al. | |
| 8,388,848 B2 | 3/2013 | Odaka et al. | |
| 8,519,559 B2 | 8/2013 | Konishi et al. | |
| 8,617,397 B2 | 12/2013 | Ikeyama et al. | |
| 8,808,539 B2 | 8/2014 | Karabelas et al. | |
| 9,709,429 B2 * | 7/2017 | Chatterjee | C02F 1/008 |
| 2008/0295951 A1 | 12/2008 | Hiro et al. | |
| 2008/0308504 A1 | 12/2008 | Hallan et al. | |
| 2011/0114561 A1 | 5/2011 | Konishi et al. | |
| 2013/0334124 A1 * | 12/2013 | Konishi | B01D 63/10 210/321.83 |
| 2016/0370245 A1 * | 12/2016 | Haldorsen | G01L 19/0618 |
| 2017/0252700 A1 | 9/2017 | Goto et al. | |

FOREIGN PATENT DOCUMENTS

| | | | | |
|---|---|---|---|---|
| EP | 2682176 A1 * | 1/2014 | | B01D 63/12 |
| EP | 2682176 A1 | 1/2014 | | |
| JP | 2011045843 A | 3/2011 | | |
| JP | 2016019932 A | 2/2016 | | |
| WO | 97/06693 A1 | 2/1997 | | |
| WO | 2012/117669 A1 | 9/2012 | | |
| WO | 2016/035704 A1 | 6/2017 | | |

OTHER PUBLICATIONS

Malavasi, et. al., Flow Measurement and Instrumentation, 28 (2012) 57-66.

PCT International Search Report, dated Jun. 18, 2018, for International Application No. PCT/US2018/023215, dated Mar. 20, 2018; ISA/EPO; Bernd Goers, Authorized Officer.

* cited by examiner

SPIRAL WOUND MODULE ASSEMBLY INCLUDING INTEGRATED PRESSURE MONITORING

FIELD

The invention generally relates to spiral wound module assemblies and in particular, assemblies useful in treating pressurized fluids.

INTRODUCTION

Spiral wound membrane assemblies are used in a wide variety of fluid separations. In a conventional embodiment, one or more spiral wound reverse osmosis (RO) or nanofiltration (NF) membrane modules ("elements") are serially connected within a common pressure vessel. Large scale water treatment facilities typically include multiple trains and/or stages of vessels, each including from 6-8 spiral wound modules. Monitoring module performance is difficult given that the modules are sealed within pressure vessels. Nevertheless, a variety of techniques have been developed, see for example: WO2012/117669, U.S. Pat. Nos. 8,808, 539, 8,617,397, 8,519,559, 8,272,251, 8,210,042, 7,886,582, US2011/10114561 and JP2016/019932. Less complicated monitoring systems are desired, including those that require little to no modification of existing modules and pressure vessel designs and which avoid the use of retractable probes.

SUMMARY

The invention includes a spiral wound module assembly, its method of use and combinations of such assemblies. In a preferred embodiment, the subject spiral wound module assembly (39) includes:

a pressure vessel (40) including: a chamber (41) extending along an axis (X) between a first end (38) and a second end (38'), at least one feed inlet port (42), concentrate outlet port (42') and permeate outlet port (44), and a removable end plate (54) located at an end (38, 38') of the vessel, wherein the permeate outlet port (44) extends axially through the removable end plate (54);

a plurality of spiral wound modules (2, 2') axially aligned in serial arrangement within the chamber (41) with a first module (2) located adjacent the first end (38) and a second module (2') located adjacent the second end (38'), wherein each spiral wound module (2, 2') comprises at least one membrane envelope (4) wound about a permeate collection tube (8) including an inner periphery (9) and wherein the permeate collection tubes (8) of each spiral wound module (2, 2') are in sealed fluid communication with each other;

a permeate adaptor tube (52) in sealed fluid communication with the permeate collection tube (8) of the first spiral wound module (2) and the permeate outlet port (44) and a flow plate (58) including an opposing first and second side (60, 61) positioned within the chamber (41) between the first spiral wound module (2) and the first end (38) of the pressure vessel (40), wherein the flow plate (58) is disposed concentrically about the permeate adaptor tube (52) and extends radially outward within the chamber (41) with the first side (60) facing the first spiral wound module (2) and the second side (61) facing the first end (38), and wherein the flow plate (58) includes a plurality of holes (62) passing from the first side (60) to the second side (61) that create a pressure drop in fluid between the first spiral wound module (2) and the closer of the feed inlet port (42) and concentrate outlet port (42'); and a differential pressure sensor (64) located within the chamber (41) and in communication with the first and second sides (60, 61) of the flow plate (58), wherein the differential pressure sensor (64) is adapted to measure differences in pressure between fluid located on the opposing sides (60, 61) of the flow plate (58).

Many additional embodiments are described.

BRIEF DESCRIPTION OF THE DRAWINGS

The figures are not to scale and include idealized views to facilitate description. Where possible, like numerals have been used throughout the figures and written description to designate the same or similar features.

DETAILED DESCRIPTION

The present invention includes a spiral wound module suitable for use in reverse osmosis (RO) and nanofiltration (NF) systems. Such modules include one or more RO or NF membrane envelops and feed spacer sheets wound about a permeate collection tube. RO membranes used to form envelops are relatively impermeable to virtually all dissolved salts and typically reject more than about 95% of salts having monovalent ions such as sodium chloride. RO membranes also typically reject more than about 95% of inorganic molecules as well as organic molecules with molecular weights greater than approximately 100 Daltons. NF membranes are more permeable than RO membranes and typically reject less than about 95% of salts having monovalent ions while rejecting more than about 50% (and often more than 90%) of salts having divalent ions—depending upon the species of divalent ion. NF membranes also typically reject particles in the nanometer range as well as organic molecules having molecular weights greater than approximately 200 to 500 Daltons. For purposes of this description, the term "hyperfiltration" encompasses both RO and NF.

Figure 1:
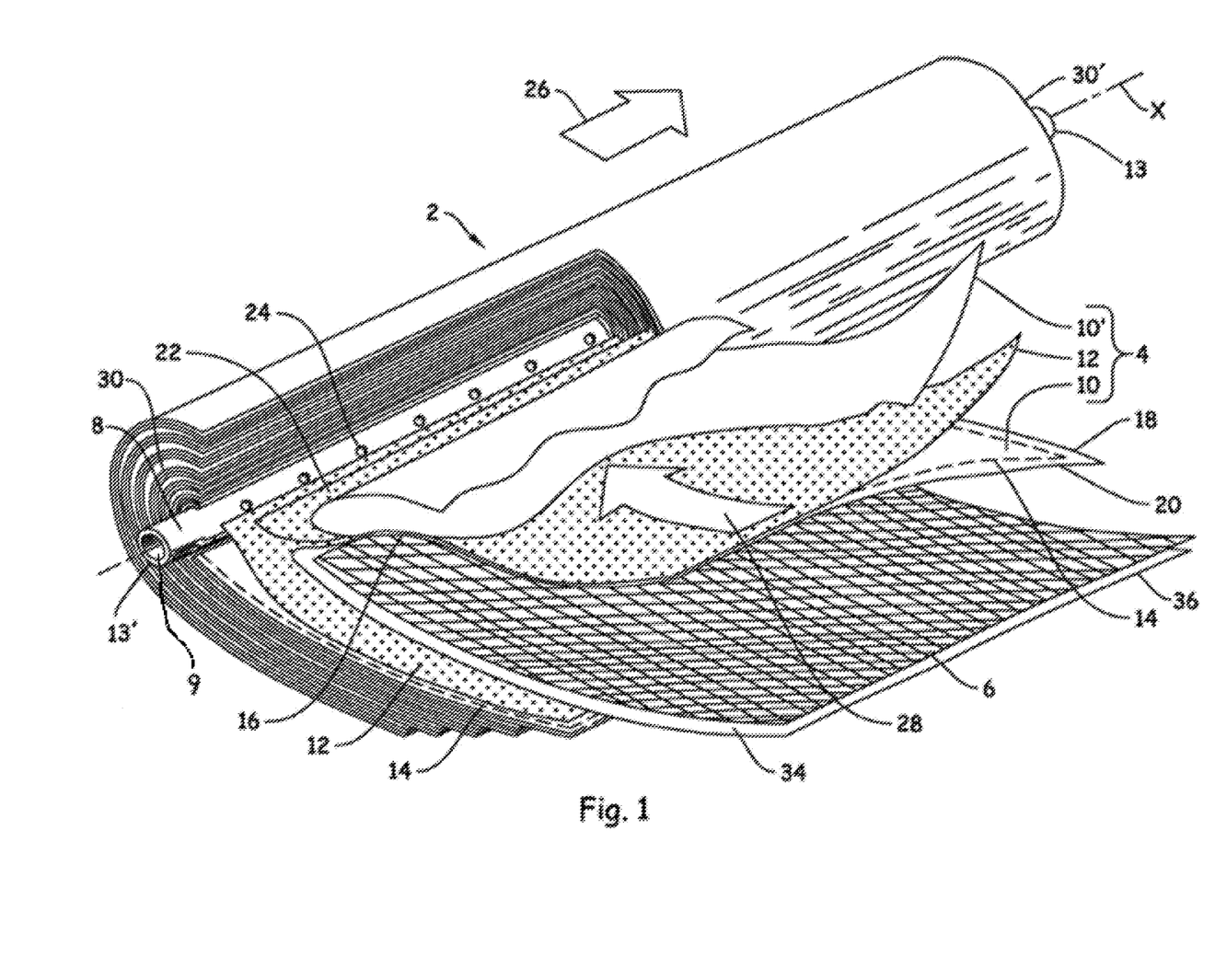
FIG. 1 is a perspective, partially cut-away view of a spiral wound module.

A representative spiral wound membrane module is generally shown at 2 in FIG. 1. The module (2) is formed by concentrically winding one or more membrane envelopes (4) and optional feed spacer sheet(s) ("feed spacers") (6) about a permeate collection tube (8). The permeate collection tube (8) includes an inner periphery (9) and length extending between an opposing first and second end (13', 13) and includes a plurality of openings (24) along a portion of its length. Each membrane envelope (4) preferably comprises two substantially rectangular sections of membrane sheet (10, 10'). Each section of membrane sheet (10, 10') has a membrane or front side (34) and support or back side (36). The membrane envelope (4) is formed by overlaying membrane sheets (10, 10') and aligning their edges. In a preferred embodiment, the sections (10, 10') of membrane sheet surround a permeate spacer sheet (12). This sandwich-type structure is secured together, e.g. by sealant (14), along three edges (16, 18, 20) to form an envelope (4) while a fourth edge, i.e. "proximal edge" (22) abuts the permeate collection tube (8) so that the inside portion of the envelope (4) (and optional permeate spacer (12)) is in fluid communication with the openings (24) extending along a portion of the length of the permeate collection tube (8). The module (2) may include a single envelope or a plurality of membrane envelopes (4) each separated by a feed spacer sheet (6). In the illustrated embodiment, membrane envelopes (4) are formed by joining the back side (36) surfaces of adjacently positioned membrane leaf packets. A membrane leaf packet comprises a substantially rectangular membrane sheet (10) folded upon itself to define two membrane "leaves" wherein the front sides (34) of each leaf are facing each other and the fold is axially aligned with the proximal edge (22) of the membrane envelope (4), i.e. parallel with the permeate collection tube (8). A feed spacer sheet (6) is shown located between facing front sides (34) of the folded membrane sheet (10). The feed spacer sheet (6) facilitates flow of feed fluid through the module (2). While not shown, additional intermediate layers may also be included in the assembly. Representative examples of membrane leaf packets and their fabrication are further described in U.S. Pat. No. 7,875,177.

Figure 3:
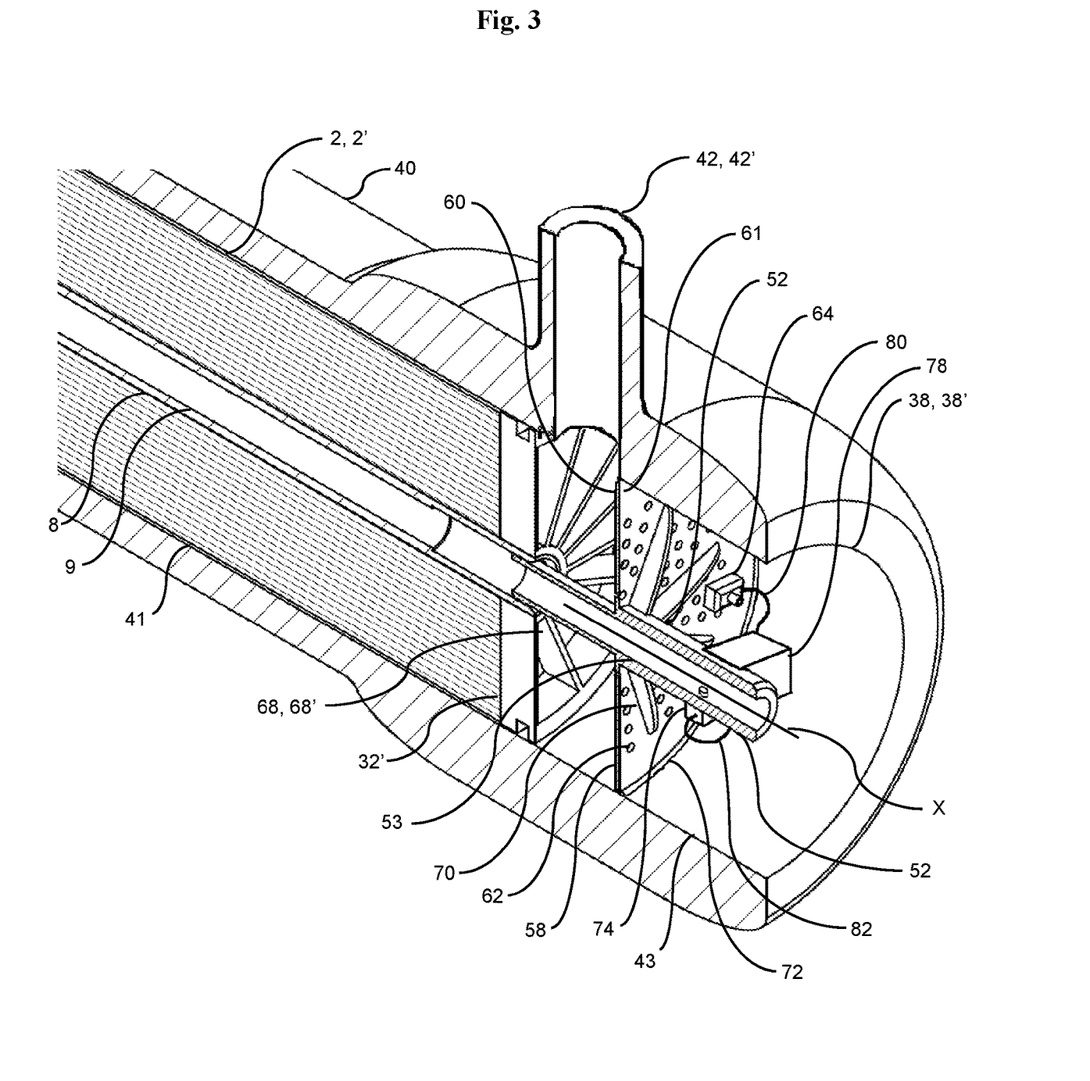
FIG. 3 is a cross-sectional, perspective, partially cut-away view of a partially assembled spiral wound module assembly showing a flow plate and differential pressure sensor.

During module fabrication, permeate spacer sheets (12) may be attached about the circumference of the permeate collection tube (8) with membrane leaf packets interleaved therebetween. The back sides (36) of adjacently positioned membrane leaves (10, 10') are sealed about portions of their periphery (16, 18, 20) to enclose the permeate spacer sheet (12) and to form a membrane envelope (4). Suitable techniques for attaching the permeate spacer sheet to the permeate collection tube are described in U.S. Pat. No. 5,538,642. The membrane envelope(s) (4) and feed spacer(s) (6) are wound or "rolled" concentrically about the permeate collection tube (8) to form two opposing scroll faces (inlet scroll face and outlet scroll face). The resulting spiral bundle is held in place by tape or other means. The scroll faces of the module may then be trimmed and a sealant may optionally be applied at the junction between the scroll face and permeate collection tube (8) as described in U.S. Pat. No. 7,951,295. The ends of the module, e.g. inlet end (30) and outlet end (30'), may either be an exposed scroll face or comprise an anti-telescoping device (or "end cap"), as shown in FIG. 3 as (32). Examples are described in U.S. Pat. No. 6,632,356. An impermeable layer such as tape may be wound about the circumference of the wound module as described in U.S. Pat. No. 8,142,588. In alternative embodiments, a porous tape or fiberglass coating may be applied to the module's periphery.

In operation pressurized feed liquid (water) enters the module (2) at the inlet end (30) and flows in a generally axial direction through the module and exits as concentrate at the outlet end (30') in the direction shown by arrow (26). Permeate flows along a permeate flow path generally shown by arrow (28) which extends through the membrane (10, 10') and into the membrane envelope (4) where it flows into the openings (24), through the permeate collection tube (8) and exits the second end (13) of the tube (8).

Materials for constructing various components of spiral wound modules are well known in the art. Suitable sealants for sealing membrane envelopes include urethanes, epoxies, silicones, acrylates, hot melt adhesives and UV curable adhesives. While less common, other sealing means may also be used such as application of heat, pressure, ultrasonic welding and tape. Permeate collection tubes are typically made from plastic materials such as acrylonitrile-butadiene-styrene, polyvinyl chloride, polysulfone, poly (phenylene oxide), polystyrene, polypropylene, polyethylene or the like. Tricot polyester materials are commonly used as permeate spacers. In some modules, the permeate collection tube comprises multiple sections and these may be joined together, such as by adhesive or spin welding. Additional permeate spacers are described in U.S. Pat. No. 8,388,848.

The membrane sheet is not particularly limited and a wide variety of materials may be used, e.g. cellulose acetate materials, polysulfone, polyether sulfone, polyamides, polysulfonamide, polyvinylidene fluoride, etc. A preferred membrane is a three layer composite comprising 1) a backing layer (back side) of a nonwoven backing web (e.g. a non-woven fabric such as polyester fiber fabric available from Awa Paper Company), 2) a middle layer comprising a porous support having a typical thickness of about 25-125 µm and 3) a top discriminating layer (front side) comprising a thin film polyamide layer having a thickness typically less than about 1 micron, e.g. from 0.01 micron to 1 micron but more commonly from about 0.01 to 0.1 µm. The backing layer is not particularly limited but preferably comprises a non-woven fabric or fibrous web mat including fibers which may be orientated. Alternatively, a woven fabric such as sail cloth may be used. Representative examples are described in U.S. Pat. Nos. 4,214,994; 4,795,559; 5,435,957; 5,919,026; 6,156,680; US 2008/0295951 and U.S. Pat. No. 7,048,855. The porous support is typically a polymeric material having pore sizes which are of sufficient size to permit essentially unrestricted passage of permeate but not large enough so as to interfere with the bridging over of a thin film polyamide layer formed thereon. For example, the pore size of the support preferably ranges from about 0.001 to 0.5 µm. Non-limiting examples of porous supports include those made of: polysulfone, polyether sulfone, polyimide, polyamide, polyetherimide, polyacrylonitrile, poly(methyl methacrylate), polyethylene, polypropylene, and various halogenated polymers such as polyvinylidene fluoride. The discriminating layer is preferably formed by an interfacial polycondensation reaction between a polyfunctional amine monomer and a polyfunctional acyl halide monomer upon the surface of the microporous polymer layer.

The proto-typical membranes for reverse osmosis are FilmTec Corporation's FT-30™ type membranes, made by reaction of m-phenylene diamine and trimesoyl chloride. This and other interfacial polycondensation reactions are described in several sources (e.g. U.S. Pat. Nos. 4,277,344 and 6,878,278). The polyamide membrane layer may be prepared by interfacially polymerizing a polyfunctional amine monomer with a polyfunctional acyl halide monomer, (wherein each term is intended to refer both to the use of a single species or multiple species), on at least one surface of a porous support. As used herein, the term "polyamide" refers to a polymer in which amide linkages (—C(O)NH—) occur along the molecular chain. The polyfunctional amine and polyfunctional acyl halide monomers are most commonly applied to the porous support by way of a coating step from solution, wherein the polyfunctional amine monomer is typically coated from an aqueous-based or polar solution and the polyfunctional acyl halide from an organic-based or non-polar solution.

In operation, one or more (e.g. typically 6-10) spiral wound modules are housed within a pressure vessel which collectively defines a spiral wound assembly. The vessel includes a feed inlet port, concentrate outlet port and permeate outlet port. The feed inlet port is adapted for connection with a pressurized source of feed liquid. The concentrate outlet port is adapted for connection to a pathway for re-use or disposal. The permeate outlet port is adapted for connection to a pathway for storage, use, or further treatment. Pressure vessels used in the present invention are not particularly limited but preferably include a solid structure capable of withstanding pressures associated with operating conditions. The vessel structure preferably includes a chamber having an inner periphery corresponding in size and shape to that of the outer periphery of the spiral wound modules to be housed therein. The orientation of the pressure vessel is not particularly limited, e.g. both horizontal and vertical orientations may be used. Examples of applicable pressure vessels, module arrangements and loading are described in: U.S. Pat. Nos. 6,074,595, 6,165,303, 6,299,772 and US 2008/0308504. Manufacturers of pressure vessels for large systems include Pentair of Minneapolis Minn., Bekaert of Vista Calif. and Bel Composite of Beer Sheva, Israel.

Figure 2:
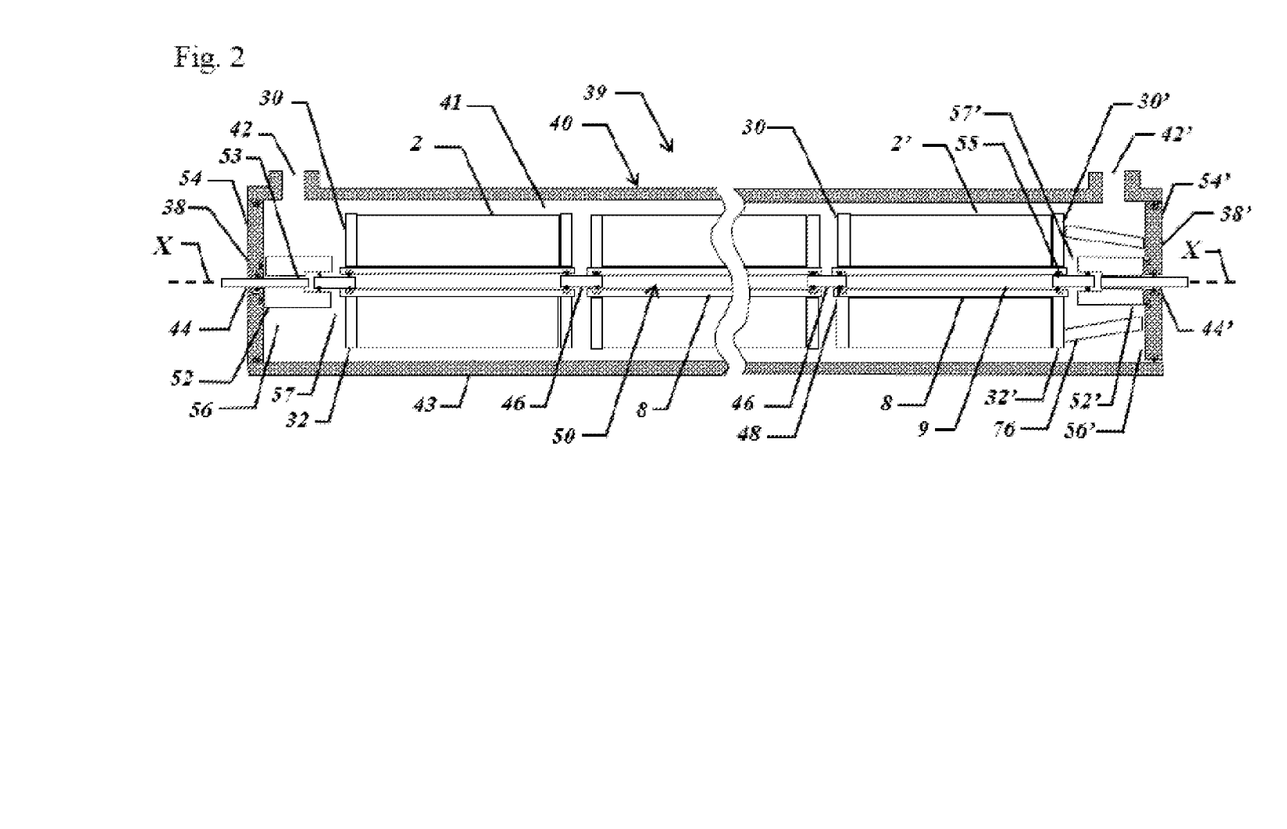
FIG. 2 is a cross-sectional view of a spiral wound module assembly including a plurality of spiral wound modules axially aligned in a serial relationship within a pressure vessel.

A typically embodiment of a spiral wound module assembly is generally shown at 39 in FIG. 2. As shown, the assembly includes a plurality of spiral wound modules (2, 2') axially aligned (along axis X) in a serial arrangement within a pressurizable chamber (41) of a pressure vessel (40). The chamber (41) includes a peripheral surface (43) then encloses the modules (2, 2'). The permeate collection tubes (8) of adjacent modules (2, 2') may be joined by interconnectors (46) along with an optional permeate seal (48). The effect of the joined tubes (8) is to define a combined permeate collection region (50) for the vessel (40). The pressure vessel (40) extends along a central axis (X) between a first and second end (38, 38'). The vessel (40) includes at least one removable end plate (54) located at one end (38, 38') of the vessel (40). Removal of the end plate (54) allows the chamber (41) to be loaded and unloaded with modules (2). In an alternative embodiment, removable end plates (54, 54') may be located at both ends (38, 38'). The vessel (40) includes several fluid ports (42, 42', 44, and 44'), e.g. at least one feed inlet port (42), concentrate outlet port (42') and permeate outlet port (44). Additional ports may be included, e.g. feed inlet ports, concentrate outlet ports and permeate outlet ports (44, 44') at each end (38, 38') of the vessel. Similarly, the feed inlet and concentrate outlet ports may be provided in reversed orientation from that shown in FIG. 2. For simplicity of description, the feed inlet and concentrate outlet ports may be generically referenced by port (42/42'). While shown in a radial configuration, one or more feed and concentrate ports may assume an axial configuration extending through the ends (38, 38') of the vessel (40). A gap space (56, 56') is located within the chamber (41) between the ends (38, 38') of the vessel (40) and nearest module (2, 2'). In a preferred embodiment, a thrust ring (76) may be positioned within the gap space (56') which is designed to transfer an axial load on the module (2') positioned closest to the end plate (54').

As shown, permeate adapter tubes (52) may be located at either or both ends (38, 38') of the vessel (40) in fluid communication with the permeate collection tube (8) of the nearest axially aligned spiral wound module. For example, a permeate adapter tube (52) is provided in sealed fluid communication with the permeate collection tube (8) of the first spiral wound module (2) and the permeate outlet port (44). In preferred embodiments, the permeate adapter tube (52) comprises a hollow conduit (53) that defines a sealed passageway for permeate to pass from the first spiral wound module (2) to the permeate outlet port (44), e.g. from the permeate collection region (50) to exit the vessel (40). Alternatively, a permeate adapter tube (52) may include a plug (66) sealed within the inner periphery (9) of the permeate collection tube (8) of the second spiral wound module (2') that seal one end (38') of the permeate collection region (50) and prevents permeate from passing from the permeate collection region (50) to the permeate outlet port (44'). In the embodiment of FIG. 2, gap spaces (56, 56') are shown near both ends (38, 38') of the vessel (40) along with corresponding permeate adaptor tubes (52, 52'). The permeate adapter tube (52) may be a single integral unit or it may comprise a plurality of parts that join to form a unit sealing to both the nearest module (2, 2') and the permeate outlet port (44). For instance, the permeate adapter tubes (52, 52') illustrated in FIG. 2 each include a first part that comprises a permeate pipe passing through the permeate outlet port (44, 44') into the vessel (40) and a second mating part that comprises a connection to the permeate collection tube (8) of the nearest module (2, 2'). The two parts are illustrated as sealed by an O-ring. The permeate adapter tube (52) on the left is illustrated with a hollow conduit (53) that provides a sealed passageway for permeate to pass from the permeate collection tube (8) of its nearest spiral wound module, i.e. the first spiral wound module (2), and exit the vessel (40). The permeate adapter tube (52') on the right includes a plug (66) that is sealed within the permeate collection tube (8) of the nearest spiral wound module, i.e. the second spiral wound module (2'). The plug (66) seals the permeate collection region (50), including the hollow inside (9) of this permeate collection tube (8), from an adjacent region (68, 68') of pressurized feed or concentrate solution within the vessel (40). This prevents pressurized feed or concentrate solution from entering the permeate collection tube (8).

Figure 4:
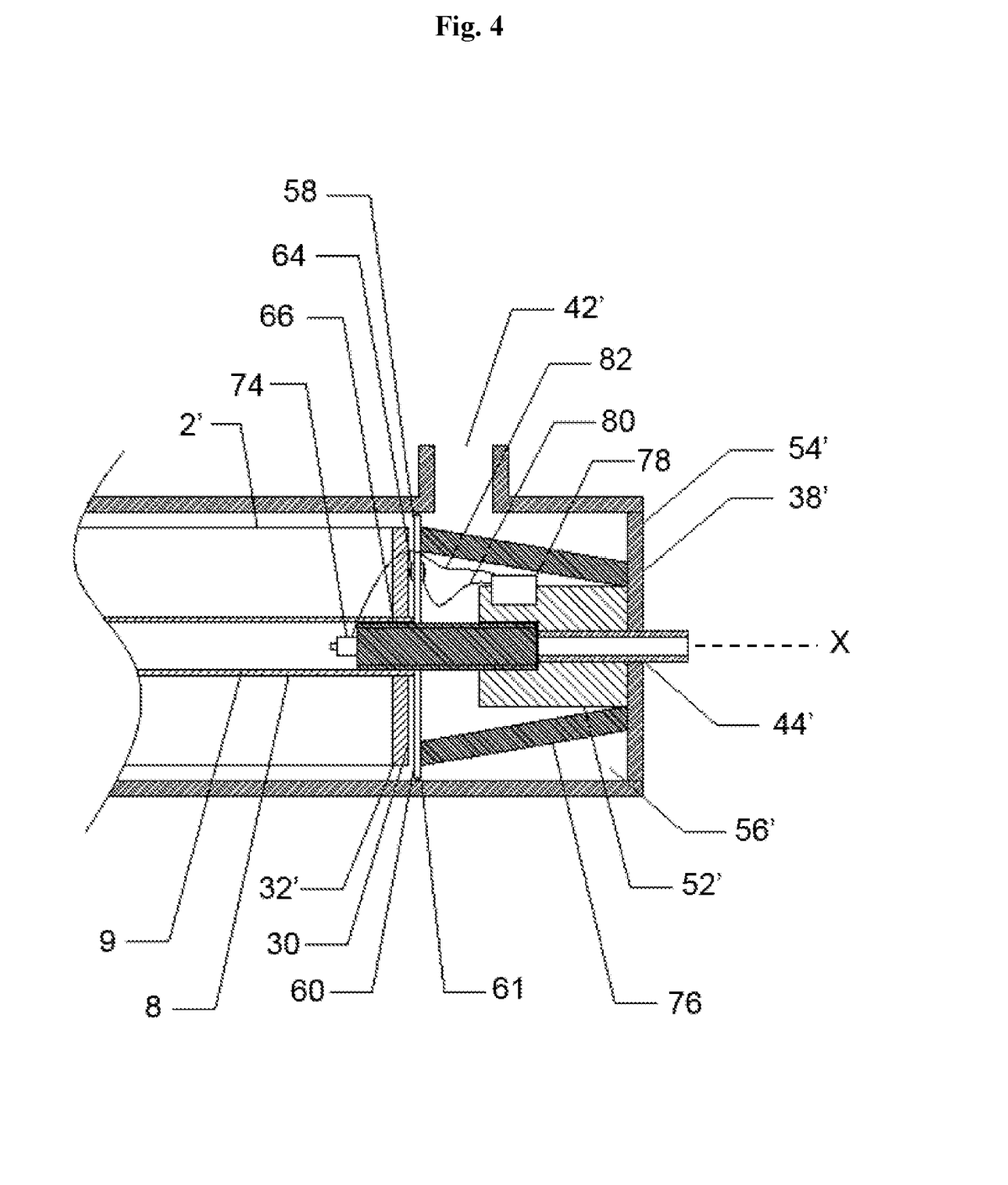
FIG. 4 is a cross-sectional, partially cut-away view of a fully assembled spiral wound module assembly showing a flow plate installed between an end cap and thrust ring.

FIG. 3 illustrates a partially assembled spiral wound module assembly similar to that shown in FIG. 2. However, the end plate (54') and optional thrust ring (76) are removed to facilitate further description. In particular, the assembly includes a flow plate (58) shown in an intermediate state of assembly, i.e. being moved axially into the chamber (41) from the end (38') of the vessel (40) toward an abutting arrangement against the end cap (32') of a spiral wound module (e.g. second module (2'). A fully assembled spiral wound module assembly showing a similar embodiment is illustrated in FIG. 4. The flow plate (52) is disposed concentrically about the permeate adaptor tube (52') and extends radially outward within the chamber (41). A seal member (72) is preferably positioned circumferentially about the flow plate (58) and is adapted to sealing engage with the peripheral surface (43) of the chamber (41). The flow plate (52) includes an opposing first and second side (60, 61) and is positioned within the chamber (41) between at least one of the first or second spiral wound module (2, 2') (i.e. outermost modules) and the respective first or second end (38, 38') of the pressure vessel (40), with the first side (60) facing the spiral wound module (2, 2') and the second side (61) facing the corresponding end (38, 38') of the vessel (40). The flow plate (58) includes a plurality of holes (62) passing from the first side (60) to the second side (61) that create a pressure drop in fluid between the adjacently positioned spiral wound module (2, 2') and the respective fluid port, i.e. the feed inlet port (42) or concentrate outlet port.

In preferred embodiments, the number and size of holes (62) creates a resistance to fluid (e.g. water at 25° C.) flow through the flow plate (58) that produces a pressure drop of between 0.05 psi (3.45 kPa) and 1.5 psi (10.3 kPa) more preferably between 0.1 psi (0.69 kPa) and 1.0 psi (6.9 kPa), for a face velocity of 5 cm/sec. For example, a 20 cm diameter module with a 3.5 cm diameter permeate tube would have an area for feed flow of 304 cm². A face velocity of 5 cm/sec would correspond to about 1.52 Liters/sec of feed or concentrate solution.

Assuming a single centered orifice in a pipe, the mass flow rate $q_m$ (kg/s) can be estimated from the orifice diameter d (m), the density $\rho_1$ (kg/m3), and the differential pressure $\Delta p$ (Pa). (ISO 5167-1:2003). The part in brackets is a combination of dimensionless units that is typically between 0.6 and 0.85.

$$q_m = \left[\frac{C\varepsilon}{\sqrt{1-\beta^4}}\right]\frac{\pi}{4}d^2\sqrt{2\Delta p \rho_1}$$

From this relationship and the 20 cm diameter module described, one can approximate that 50 holes of 4 mm diameter would produce about 1 psi (6.9 kPa) pressure drop across the plate (58) at 5 cm/sec face velocity. More precise methods for calculating pressure drop in a plate with multiple holes have been described in Malavasi, et. al., *Flow Measurement and Instrumentation*, 28 (2012) 57-66. In preferred embodiments, the flow plate (58) includes a plurality of holes between 0.5 and 10 mm, more preferably between 1 mm and 5 mm.

Depending upon the materials of construction, a pressure drop induced across the flow plate (58) may cause substantial deformation of the flow plate. In some embodiments, the flow plate (58) includes at least one and preferably several radial support ribs (70) on at least one of its sides (60, 61). In some embodiments, a seal member (72) is provided on the periphery of the flow plate (58). The seal member (72) contacts the end cap (32) of the nearest spiral wound module (2) or the inner peripheral surface (43) of the chamber (41), making a seal that forces feed solution through holes (62) in the flow plate (58). As best shown in FIG. 4, the flow plate (58) may also be located between a thrust ring (76) and an end cap (32') of the spiral wound module (2').

A differential pressure sensor (64) is located within the chamber (41) and is in simultaneous communication with the first and second sides (60, 61) of the flow plate (58). The differential pressure sensor (64) is adapted to measure differences in pressure between fluids located on the opposing sides (60, 61) of the flow plate (58). In preferred embodiments, the differential pressure sensor (64) includes a diaphragm. Preferably, the diaphragm separates solutions contacting opposing first and second sides (60, 61) of the flow plate (58). Examples of differential pressure sensors include Omega's PX26-001DV, Dwyer 629C-02-CH-P2-E5-S1, and Cole-Parmer EW-68071-52.

The differential pressure sensor (64) is preferably secured to the flow plate (58) and may include power and signal leads or wires in communication with an external power source or signal processor or storage device located outside the vessel (40). For example, power or signal leads may extend from the differential pressure sensor (64) through the feed inlet port (42), concentrate outlet port (42'), or a permeate outlet port (44) to an externally located device, such as a micro-processing unit (78). In other embodiments, leads transmitting power or signal may extend from the differential pressure sensor (64) to a micro-processing unit (78) located within the gap space (56, 56'). In preferred embodiments, wires located within the permeate adapter tube (52) pass through the permeate outlet port (44), and these wires, passing between the inside and outside of the vessel (40), provide at least one of power for the differential pressure sensor (64) or a signal corresponding to a differential pressure measurement.

In some embodiments, the differential pressure sensor (64) is encased or "potted" within a protective polymeric resin (e.g. thermoset or thermoplastic material), thus enabling it to function at feed pressures exceeding 10 bar, more preferably exceeding 15 bar, or even exceeding 20 bar. Preferred potting materials include urethanes, epoxies, and hot melts, and the differential pressure sensor (64) is considered to "function" when its reading varies less than 1% by changing the pressure between 0 to 10 bar, 0 to 15 bar, or 0 to 20 bar, respectively.

The spiral wound module assembly may also include a second sensor (74) that may be mounted on or located within the permeate adapter tube (52). In some embodiments, the second sensor (74) is located within the permeate adapter tube (52) and is in fluid communication with the hollow conduit (53) of the permeate adapter tube (52). In other embodiments, the second sensor (74) is located on the plug (66) and is in fluid communication with the hollow periphery (9) of the permeate collection tube (8) of the nearest spiral wound module (2). (This embodiment shown in FIG. 4.) The second sensor may be a second differential pressure sensor adapted to measure differences in pressure between a contacted permeate solution, in the hollow conduit (53) of the permeate adapter tube (52) or inner periphery (9) of the permeate collection tube (8), and pressurized feed or concentrate solution within the gap space (56, 56') of the chamber (41). In other embodiments, the second sensor (74) may measure fluorescence, conductivity, or flow rate of permeate solution. In preferred embodiments, second sensor (74) may include a second set of power and signal leads or wires that communicate with the same micro-processing unit (78) as the first differential pressure sensor (64).

The micro-processing unit (78) may be located inside or outside the pressure vessel (40). It is not particularly limited and applicable examples include an autonomous integrated circuit as AD5931 from Analog Devices and integrated circuits such a model CC2430 or CC2530 from Texas Instruments. Further examples include Arduino and Raspberry Pi boards. The micro-processing unit (78) preferably includes flash memory for storing protocol, control functions and data. The micro-processing unit (78) is preferably secured to at least one of the removable end plate (54) and permeate adaptor tube (52). In order to reduce the number of wires extending from outside the vessel to the sensors within the vessel, the micro-processing unit (78) is preferably located within the vessel (40) and preferably within the gap space (56). As a consequence, fewer wires are required to pass from outside the vessel to the chamber (41). Preferably, the micro-processing unit (78) is encapsulated in potting material and joined to the permeate adapter tube (52).

Many embodiments of the invention have been described and in some instances certain embodiments, selections, ranges, constituents, or other features have been characterized as being "preferred." Such designations of "preferred" features should in no way be interpreted as an essential or critical aspect of the invention. Expressed ranges specifically include end points. The entire content of each of the aforementioned patents and patent applications are incorporated herein by reference.

The invention claimed is:
1. A spiral wound module assembly (39) comprising:
a pressure vessel (40) comprising: a chamber (41) extending along an axis (X) between a first end (38) and a second end (38'), a feed inlet port (42), a concentrate outlet port (42') a permeate outlet port (44), and a removable end plate (54) located at an end (38, 38') of the vessel, wherein the permeate outlet port (44) extends axially through the removable end plate (54);

a plurality of spiral wound modules (2, 2') axially aligned in serial arrangement within the chamber (41) such that one of said plurality of spiral wound modules (2, 2') is an outermost spiral wound module (2) located adjacent the first end (38), and wherein each spiral wound module (2, 2') comprises at least one membrane envelope (4) wound about a permeate collection tube (8) including an inner periphery (9) and wherein the permeate collection tubes (8) of each spiral wound module (2, 2') are in sealed fluid communication with each other;

a permeate adaptor tube (52) in sealed fluid communication with the permeate collection tube (8) of the outermost spiral wound module (2) and the permeate outlet port (44) and a flow plate (58) including an opposing first and second side (60, 61) positioned within the chamber (41) between the first spiral wound module (2) and the first end (38) of the pressure vessel (40), wherein the flow plate (58) is disposed concentrically about the permeate adaptor tube (52) and extends radially outward within the chamber (41) with the first side (60) facing the outermost spiral wound module (2) and the second side (61) facing the first end (38), and wherein the flow plate (58) includes a plurality of holes (62) having diameters between 0.5 and 10 mm passing from the first side (60) to the second side (61) that create a pressure drop in fluid between the outermost spiral wound module (2) and the closer of the feed inlet port (42) and concentrate outlet port (42'); wherein the plurality of holes in the flow plate (58) creates a resistance to fluid flow sufficient to produce a pressure drop of between 0.05 psi and 1.5 psi when passing water at 25° C. with a face velocity of 5 cm/sec; and a differential pressure sensor (64) located within the chamber (41) and in communication with the first and second sides (60, 61) of the flow plate (58), wherein the differential pressure sensor (64) is adapted to measure differences in pressure between fluid located on the opposing sides (60, 61) of the flow plate (58).

2. The spiral wound module assembly of claim 1 wherein the differential pressure sensor (64) includes a diaphragm that separates solutions contacting opposing first and second sides (60, 61) of the flow plate (58).

3. The spiral wound module assembly of claim 1 wherein the differential pressure sensor (64) is encased within a polymeric resin.

4. The spiral wound module assembly of claim 1 wherein the flow plate (58) comprises at least one radially extending support rib (70) on at least one of the first and second sides (60, 61); wherein the at least one radially extending support rib (70) is connected to and extends axially from an occluding surface having a plurality of holes therethrough.

5. The spiral wound module assembly of claim 1 wherein the permeate adapter tube (52) comprises a hollow conduit (53) defining a sealed passageway for permeate to pass from the permeate collection tube (8) of the outermost spiral wound module (2) to the permeate outlet port (44), and a second sensor (74) located within the permeate adapter tube (52) and in communication with the hollow conduit (53).

6. The spiral wound module assembly of claim 1 wherein a peripheral seal member (72) is located circumferentially about the flow plate (58) in sealing contact with a peripheral surface (43) of the chamber (41).

7. The spiral wound module assembly of claim 1 wherein the flow plate (58) is located between the outermost spiral wound module (2) and a thrust ring (76).

8. The spiral wound module assembly of claim 7 wherein the second side (61) of the flow plate (58) contacts the thrust ring (76).

9. The spiral wound module assembly of claim 1 further comprising a plug (66) that is suitable to prevent permeate from passing between the permeate collection region (50) and the permeate outlet port (44).

10. The spiral wound module assembly of claim 1, further comprising wires communicating with a power source located outside the vessel, suitable to provide power for the differential pressure sensor.

11. The spiral wound module assembly of claim 1, wherein the wires located within the permeate adapter tube (52) pass through the permeate outlet port (44), and said wires provide at least one of power for the differential pressure sensor (64) and a signal corresponding to a differential pressure measurement.

* * * * *